No. 777,617. PATENTED DEC. 13, 1904.
J. W. FARNOFF.
INFLATABLE VEHICLE TIRE.
APPLICATION FILED JAN. 21, 1904.
NO MODEL.
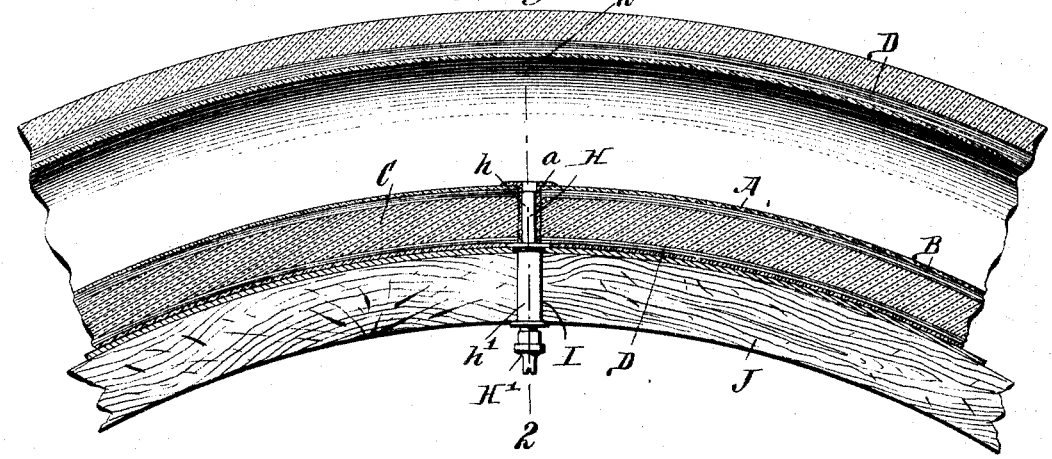
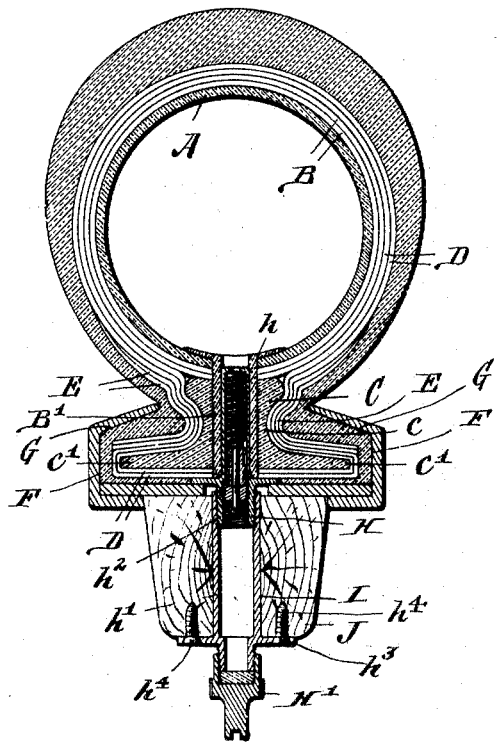
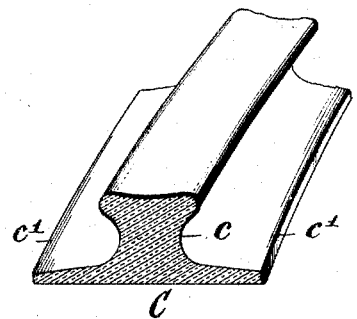
Witnesses:
Julius Laukes
B. Mason
Jay W. Farnoff, Inventor.
By Neuhart & Burkhart.
Attorneys.

No. 777,617. Patented December 13, 1904.

UNITED STATES PATENT OFFICE.

JAY W. FARNOFF, OF BUFFALO, NEW YORK, ASSIGNOR OF TWO-THIRDS TO HENRY KOONS, OF BUFFALO, NEW YORK; EDWARD L. KOONS AND MARY A. REIMAN EXECUTORS OF SAID HENRY KOONS, DECEASED.

INFLATABLE VEHICLE-TIRE.

SPECIFICATION forming part of Letters Patent No. 777,617, dated December 13, 1904.

Application filed January 21, 1904. Serial No. 190,028. (No model.)

*To all whom it may concern:*

Be it known that I, JAY W. FARNOFF, a citizen of the United States, residing at Buffalo, in the county of Erie and State of New York, have invented certain new and useful Improvements in Inflatable Vehicle-Tires, of which the following is a specification.

My invention relates to inflatable vehicle-tires; and it has for its object the production of a single-tube tire in which cementation to the vehicle rim or felly is dispensed with, while retaining all the advantages of the ordinary single-tube tire.

To this end the invention consists in providing the tire with an extended base or circumferential extension on its inner face, having lateral wings, which are engaged by suitable fastening means to clench the tire to the wheel.

In the drawings, Figure 1 is a longitudinal section of my improved tire, showing the same applied to the rim of a wheel. Fig. 2 is an enlarged cross-section taken on line 2 2, Fig. 1. Fig. 3 is a perspective view of a portion of the filling-piece.

Referring to the drawings in detail, like letters of reference refer to like parts in the several figures.

The letter A designates the inner rubber air-tube of the tire, around which one or more layers of canvas or other similar material B is placed, after which the valve-stem $a$ is inserted and suitably held in place. A filling-piece C, preferably formed of hard rubber or other solid material, is placed against the inner circumference of the tire thus far formed, said filling-piece being formed with a reduced intermediate portion $c$ and opposite lateral flanges $c'$, forming an extended inner circumferential face. The said filling-piece may, if desired, be formed of compressible rubber or any other material suitable as a filler, its purpose being to strengthen and stiffen the neck of the tire and provide an extended base for said tire. One or more layers of canvas or other similar material D is then placed around the canvas-covered tube and the filling-piece, said canvas layer or layers serving to connect the filling-piece to the canvas-covered tube, and thereby form a cylindrical tube portion, and lateral extensions, forming clench portions, connected with said tube portion by a reduced or neck portion. Canvas strips E are arranged longitudinally along the neck of the tire thus far formed, serving to greatly strengthen the tire at this point, such additional strength being desirable by reason of the tendency of side deflection of the tire when entering ruts or abrupt deflections or when turning corners. The gradual building up of the tire thus far is by means of suitable cement or rubber solution, or a complete union of the parts may be obtained in any other suitable manner. The outer rubber tube or covering is finally applied and the whole vulcanized, thereby forming a single-tube tire having an inner circumferential extension provided with lateral longitudinal extensions forming clench portions F, each extension having its outer circumferential face preferably inclined, as at G. The said clench portions F of the tire are engaged by suitable clench-hoops or other practical fastenings, forming part of the vehicle-wheel; but as such fastenings form no part of this invention detailed reference to the same is omitted.

Inserted in the valve-stem $a$ is the valve-tube H, which is formed in two sections $h\ h'$, the inner section having a slightly-projecting threaded end $h^2$, adapted to be inserted into the outer end of a radial aperture I, formed in the wheel-felly J, and having the outer internally-threaded end of the section $h'$ screwed thereon, the latter being inserted into the said aperture from the inner side of the wheel-felly and having a flange $h^3$, through which screws $h^4$ pass and enter the said felly, thereby holding the section $h'$ against turning. A suitable cap H' is screwed onto the projecting end of the valve-tube section $h'$. This construction permits of easily attaching the tire to the wheel, it requiring no effort or inconvenience to insert the slightly-projecting end of the tube-section $h$ into the aperture I in the felly.

Many changes in form, arrangement, and construction may be resorted to without departing from my invention or sacrificing any of the advantages thereof.

Having thus described my invention, what I claim is—

1. An inflatable tire consisting of an annular inner tube, a filling-piece held against the inner circumference of said tube and having lateral extensions, and an outer covering surrounding said tube and the filling-piece and having opposite lateral extensions to fit the extensions on the filling-piece, substantially as set forth.

2. An inflatable tire consisting of an annular inner tube, a fabric covering surrounding said tube, a filling-piece lying against said fabric covering on the inner circumference thereof, and having opposite lateral extensions, a fabric covering surrounding the first-mentioned fabric covering and the filling-piece, and an outer covering inclosing the whole, the complete tire thus built being vulcanized, and forming a single-tube tire having a tube portion and clencher portions connected by a reduced intermediate portion, substantially as described.

3. An inflatable tire consisting of an annular inner tube, a layer of fabric surrounding said tube, a filling-piece lying against the inner circumference of said layer of fabric and having opposite lateral extensions, a second layer of fabric surrounding the first-mentioned layer and the said filling-piece and serving to connect the parts and form an intermediate reduced portion, longitudinal layers of fabric applied to opposite sides of said reduced portion of the tire thus far built, and an outer covering having opposite lateral extensions on the inner circumference thereof and serving to envelop the whole, the complete tire thus built being vulcanized to form a single-tube tire having a tube portion, opposite clencher portions, and a reduced intermediate portion, substantially as set forth.

4. An inflatable tire comprising an annular inner tube, a solid filling-piece lying against the inner circumference of said tube, intermediate fabric layers, and an outer cover enveloping the said parts, the whole being vulcanized to form an annular single-tube tire, substantially as set forth.

5. An inflatable tire comprising an annular inner tube, a solid filling-piece having opposite lateral flanges at its inner marginal portion and lying against the inner circumference of the said tube, and an outer covering conforming substantially to the outline of the inner tube and the filling-piece, thus forming a tire having a tube portion, opposite clencher portions, and an intermediate reduced portion, the whole being vulcanized to form a complete single-tube tire, substantially as set forth.

In witness whereof I have affixed my signature in the presence of two subscribing witnesses.

JAY W. FARNOFF.

Witnesses:
EMIL NEUHART,
CHAS. F. BURKHART.